United States Patent [19]

Sebastiani et al.

[11] 4,452,063
[45] Jun. 5, 1984

[54] PROCESS FOR MAKING PIPE FITTING COMPONENTS, AND THE COMPONENTS OBTAINED THEREBY

[76] Inventors: Enrico Sebastiani, 13, Via De Cristoforis, Milan, Italy, I 20124; Augusto Archi, 16, Via Gransci, Saronno (Varese), Italy, I 21047

[21] Appl. No.: 304,812

[22] Filed: Sep. 22, 1981

[30] Foreign Application Priority Data

Sep. 24, 1980 [IT] Italy .............................. 24878 A/80

[51] Int. Cl.³ .......................................... B21D 22/00
[52] U.S. Cl. ..................................... 72/356; 72/370; 72/367; 72/340; 29/157 R; 10/86 R
[58] Field of Search .............. 72/356, 339, 340, 367, 72/370; 29/157 R; 10/86 R, 86 F

[56] References Cited

U.S. PATENT DOCUMENTS 1,142,782 6/1915 Carlson ............................ 29/157 R

FOREIGN PATENT DOCUMENTS 482031 10/1951 Italy .................................. 10/86 R

*Primary Examiner*—Daniel C. Crane
*Assistant Examiner*—David B. Jones
*Attorney, Agent, or Firm*—Wenderoth, Lind & Ponack

[57] ABSTRACT

A process is disclosed for forming pipe fitting components, in particular for the manufacture of three-piece unions made of steel and formed by cold deformation operations, by subjecting lengths of tubes cut to size to stresses substantially applied in an axial direction by the use of dies designed for acting upon at least a portion of the wall of the connecting pieces to be formed. The pipe fitting components obtained by the above process are made of steel and have peculiar features as to their size and shape.

5 Claims, 11 Drawing Figures

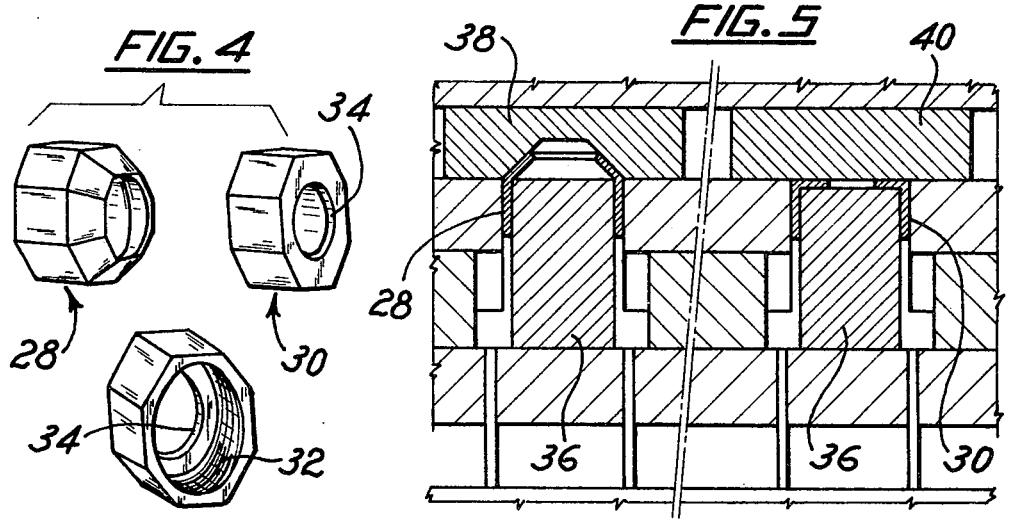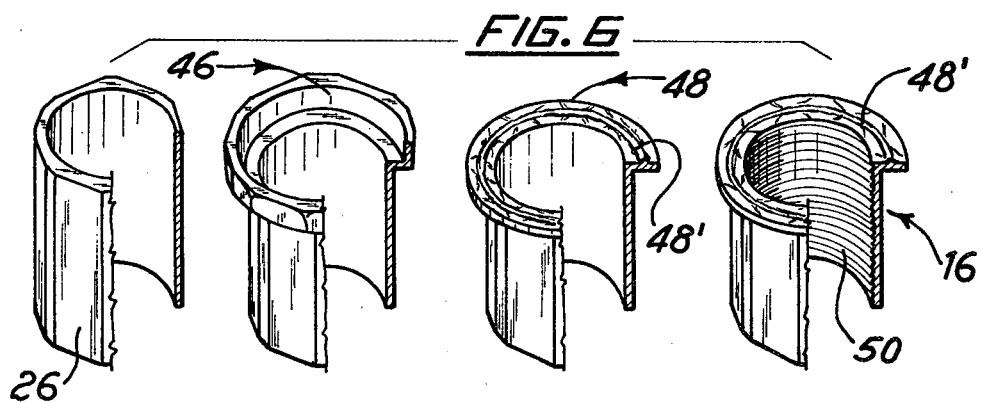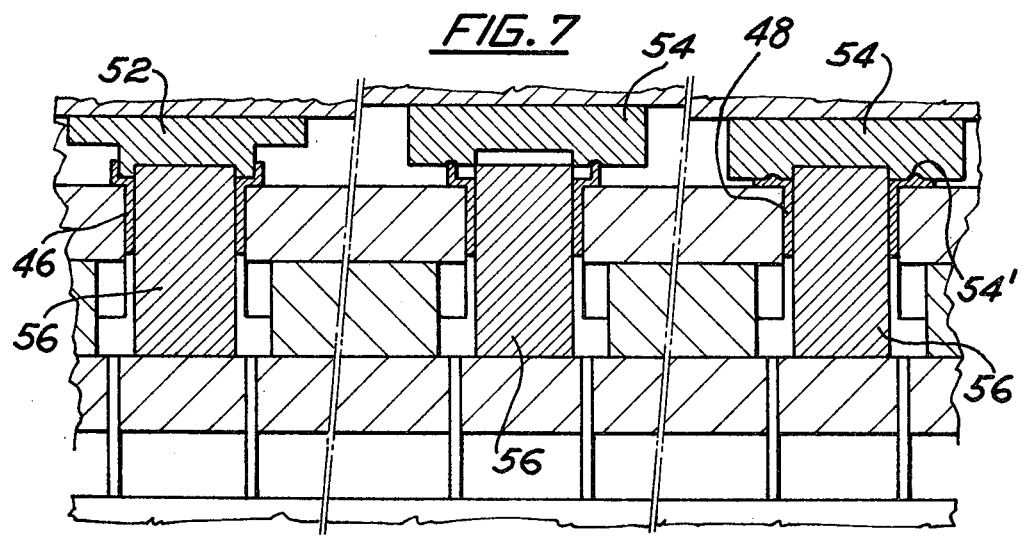

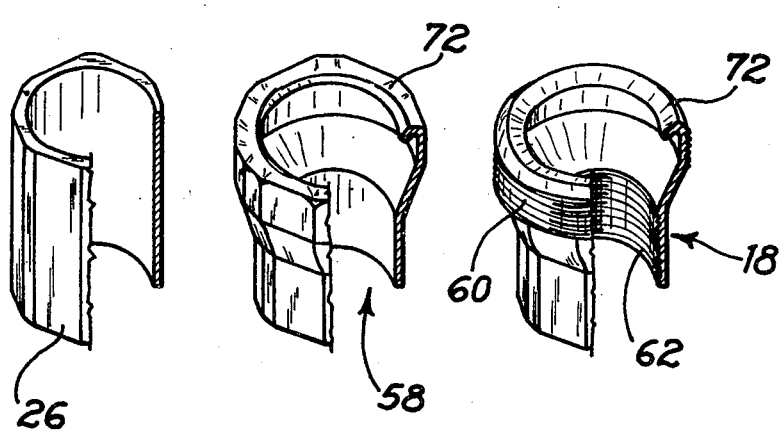
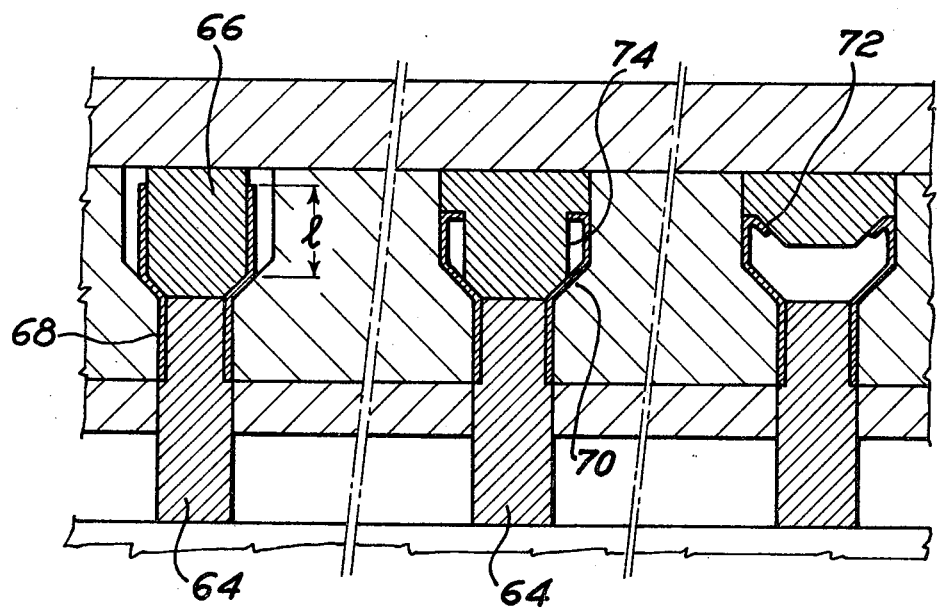

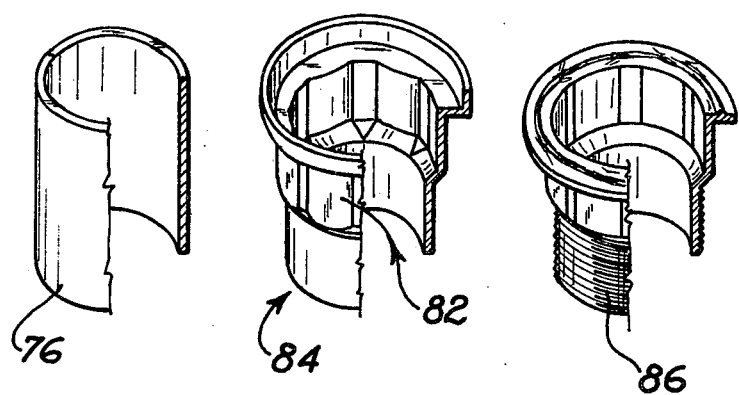
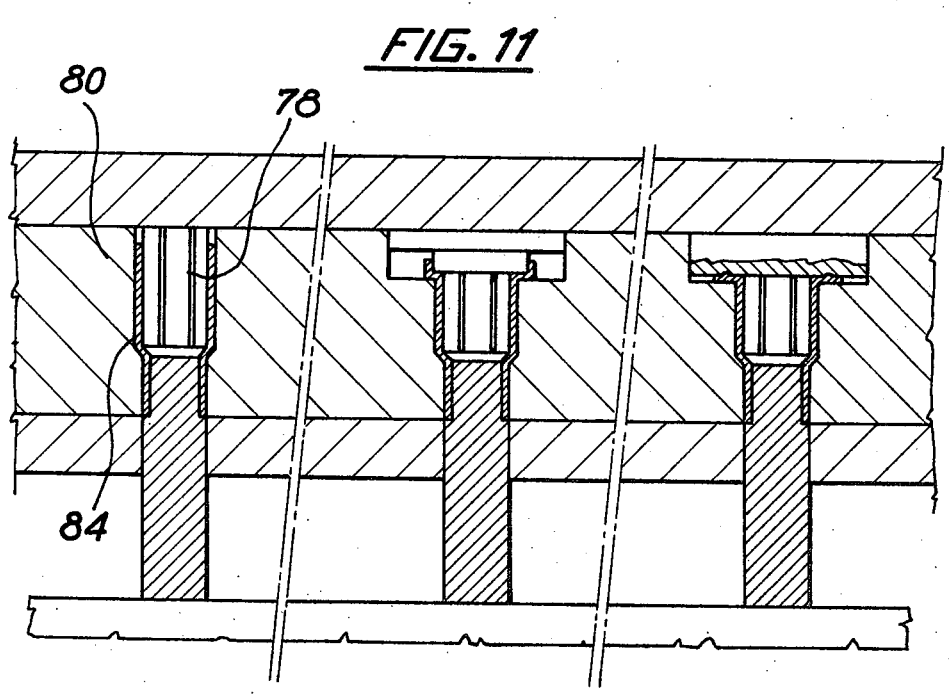

PROCESS FOR MAKING PIPE FITTING COMPONENTS, AND THE COMPONENTS OBTAINED THEREBY

BACKGROUND OF THE INVENTION

1. Field of the Invention

This invention relates to a process for the manufacture on an industrial scale of pipe fitting components, more specifically, though not exclusively, of components forming part of an unit comprised of three components or pieces conjointly forming a so-called union for the connecting together of two tubes (see, for example, UNI 5211/70).

2. Description of the Prior Art

Pipe fitting components of the same type as, or similar to, those described above are well known and widely used, as well as the subject-matter of standard classification. They are generally obtained in the form of malleable iron castings that are then submitted to machining operations. However, this method of manufacture is becoming now more and more expensive and it has led, moreover, to products of comparatively reduced accuracy or to products that are required to be subjected to further considerable and thus expensive machining operations. In addition, the material involved, and as imposed by the conditions of formation of the castings, appear to be not ideally suited for the required uses, particularly in view of the stresses to which such pipe fitting components are, in general, likeky to be subjected.

As an alternative, it has been proposed to make the above pipe fitting components by cold or hot extrusion-coinage operations carried out by starting from a pellet of a suitable material such as, for example, brass and by the use of dies reproducing the final configuration of the desired components. Though, on the one hand, this method has permitted considerable accuracy to be achieved by utilisation of more suitable materials, on the other hand, it has given rise to further difficulties that have practically reduced its use on an industrial level to a significant extent. The above mentioned operations involve, in fact, application of very high forces of deformation and they require, therefore, the use of equipment which is particularly expensive and, this notwithstanding, which has a comparatively short life. Also the treated material must have specific properties and, therefore, it is relatively high in cost. Moreover, known extrusion-coining operations are slow operations due to the large powers that are involved, and thus the productive capacity is also reduced when conducting such operations.

SUMMARY OF THE INVENTION

The object of this invention is to provide a novel process for making pipe fitting components of the types and for the uses as set forth, which components have a degree of accuracy comparable with that obtained by the use of extrusion-coining operations, but which can be manufactured from such a material and with the use of such equipment as to permit cost savings and increased productivity to be achieved not only with respect to the extrusion-coinage system but also as compared with iron casting operations, and this by the use of a material such as steel that is a more suitable material for the required applications.

The above and further objects, which will appear from the detailed description to be given later, are attained by the process according to this invention, which essentially comprises the main steps of:

cutting to size a tube-length from a steel tube having a thickness substantially equal to that of the finished component;

engaging the tube-length onto a first plug, and bringing it into contact with at least one die which is designed for acting upon at least part of the tube-length wall and which has at least one region of free expansion for the material;

subjecting the tube-length to stress substantially in an axial direction with respect to the die, in order to locally initiate a cold deformation in the wall portion which will involve a change in diameter of such wall portion;

engaging the thus predeformed tube-length onto a second plug that is different from, or coincident with, the first plug, and bringing the tube-length into contact with at least one die which is different from, or coincident with, the first die, such last-named die being designed for acting upon the same tube-length wall portion, and being provided with at least one region for free espansion of the material;

subjecting the tube-length to stress substantially in an axial direction with respect to the die, in order to complete local cold deformation of the wall portion, this stress comprising exertion of an axial squeezing action upon the material in order to cause the latter to undergo an upsetting work such as to at least substantially restore in it the original thickness which had been changed due to change in diameter occurred during deformation;

removing the deformed tube length from the die; and machining at least some surfaces of the deformed tube length.

The invention finally also relates to the pipe fitting components produced by the use of the above process, which components are differentiated from the products obtainable according to the prior art processes, substantially in that they are made of steel and have substantially zero clearance angles. In the case where normal tube-connecting threads are not formed, there would be obtained novel components which are able to be fastened by welding to an associated tube, this being hitherto net feasible with connecting pieces of iron or connecting pieces of brass (which are brazed), except that by fitting thereto very burdensome flanges.

BRIEF DESCRIPTION OF THE DRAWINGS

FIG. 4 is a diagrammatic view of the deformation and machining steps for obtaining a union nut from the tube length in FIG. 3.

FIG. 5 is a diagrammatic view showing the dies and the deformation steps used for deforming the tube length into the nut.

FIG. 6 is a diagrammatic perspective, part sectional view showing the working steps carried out on a tube length for obtaining the loose or idle piece which is part of the union shown in FIG. 1.

FIG. 7 is a diagrammatic view of the deformation steps and dies used in carrying out the process illustrated in FIG. 6.

FIG. 8 is a diagrammatic view of the working steps accomplished on a tube length for obtaining a fixed piece similar to that in FIG. 2, but of the female type.

FIG. 9 is a diagrammatic view of the deformation steps and dies used for carrying out the working process according to FIG. 8.

FIG. 10 diagrammatically shows in the same manner as viewed in FIGS. 6 and 8, the process for obtaining a different type of pipe fitting component, namely a component similar to that in FIG. 6 but of the male type, obtained in this case from a cylindrical tube, that is to say a tube not having been subjected to any previous drawing operation.

FIG. 11 is a diagrammatic view showing the deformation steps and dies used in carrying out the process to obtain the component in FIG. 10.

DESCRIPTION OF THE PREFERRED EMBODIMENTS

Figure 1:
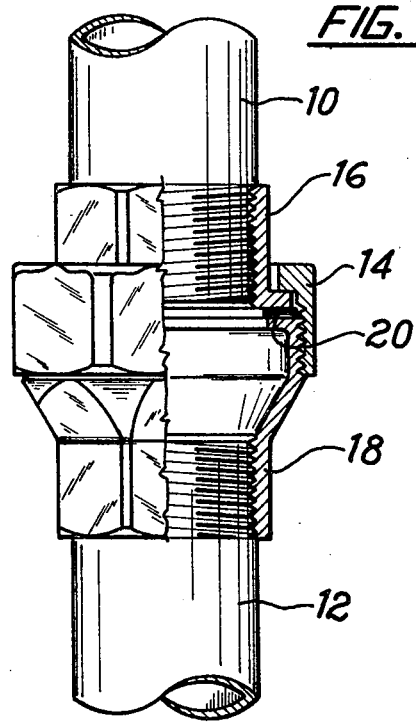
FIG. 1 is a front, part sectional view, showing an example of pipe fitting components that can be obtained according to the invention, the components being in the condition thereof as assembled into a union of an end-to-end connection or butt joint between two tubes.
Figure 2:
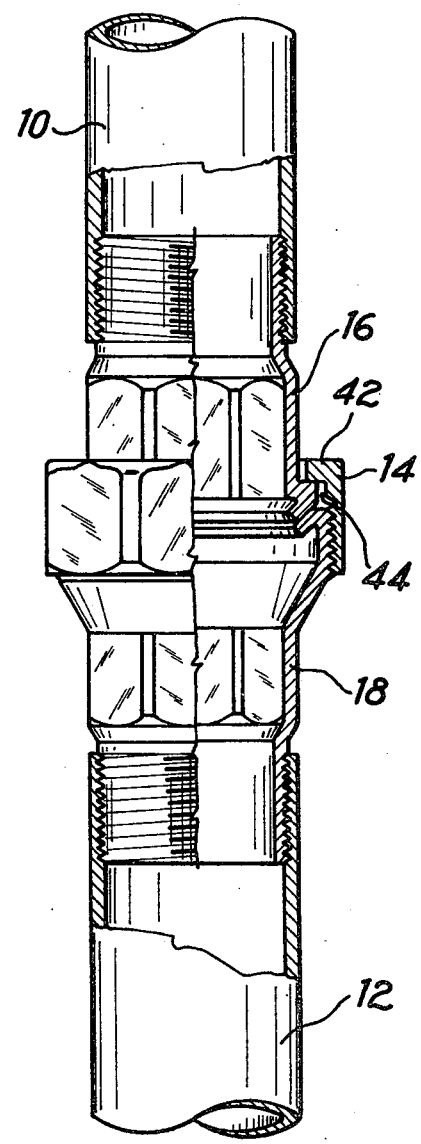
FIG. 2 is a view similar to FIG. 1 but shows a male union with a conical sealing lip.

For the connection, for example the end-to-end connection, of two tubes, such as those designated by 10 and 12 in the accompanying drawings, use is made of multi-component unions that not only are known but also are subject to Standard Specifications with respect of some dimensions thereof. Illustrated in FIGS. 1 and 2 are examples of units formed of such components, such units comprising a first component or nut member 14 designed for clamping the joint, a second component or releasable piece 16 which can be secured to the tube 10, and a third component or fixed piece 18 which can be fastened to the tube 12. The components 16 and 18 may be of the female or the male type, with plane or conical fit, and they may or may not be provided with a packing means 20 placed therebetween, according to a system that is well known in the art.

The invention makes it possible to obtain the above described components by starting from a tubular steel element having a thin thickness (but, in any case, of not less than 2 mm), which element is subjected to deformation operations, in particular by applying stresses to it mainly in an axial direction, with comparatively reduced forces involved.

Figure 3:
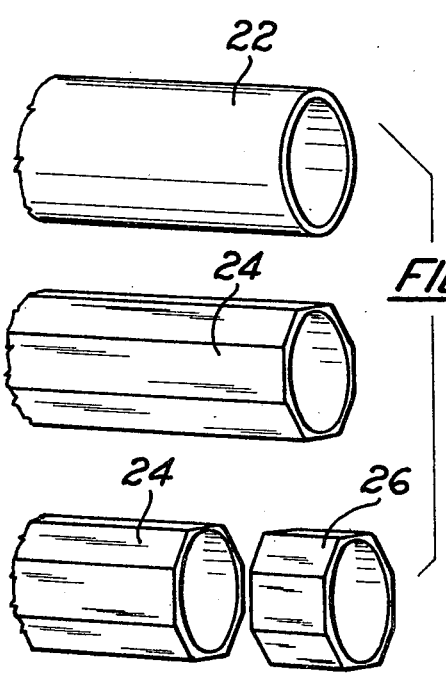
FIG. 3 is a diagrammatic perspective view, showing the initial steps of drawing and cutting a tube to obtain the pipe fitting components as illustrated in the preceding figures.

For most of the concerned pipe fitting components, the invention provides a preliminary step which comprises the drawing of a tube 22 (FIG. 3) into a tubular element 24 having an outside surface of polygonal, particularly octagonal, shape, with rounded off corners, which enables the same to be gripped by the aid of a commercially available type of wrench. In this operation, both the choice of the outer configuration of tubular element 24 and the choice of the thicknesses of starting tube 22 are made, on the one hand, with a view to maintain in tubular element 24 such minimum thicknesses as to permit further operations thereon to be conducted up to the obtention of the desired pipe fitting component, obviously possessing the required pressure resistance properties, while, on the other hand, such choices are also influenced by the fact that it is a good practice to perform a drawing operation in a single pass, in order to save costs, particularly because this way of operating enables any intervening heat treatment step to be dispensed with.

Thereafter, the tubular element 24 is cut into tube lengths 26, each of which has a predetermined axial dimension, for operations to be carried out later.

In the case where the nut 14 is formed, the process provides for a local deformation by which the walls of tube length 26 are bent inwardly, such deformation being preferably carried out in at least two steps as indicated in 28 and 30, FIG. 4, until the general shape of component 14 is attained, the component being then machined on its surface 32 (FIG. 4) to form the inside thread therein, and possibly on its surface 34 to define the diameter of the corresponding opening. The two deformation steps for obtaining the components in FIG. 4, are illustrated in FIG. 5, from which it can be seen that the drawn tube length 26 is engaged onto a plug 36, and it is coupled, in succession, with a conical shaping die 38 and a plane shaping die 40 which are designed for bending over the tube length 26 as indicated in 28 and 30, under the effect of a substantially axially directed force of compression exerted upon the tube length. As will appear from FIG. 5, the die is designed for allowing the material to have a free expansion area, in the example shown in a radial-inward direction, in such a way that specific strains do not increase beyond the limit or point of maximum deformability of the material. The top and bottom surfaces of component 14 would then show some nonuniformities of shape that would be due to incomplete distribution of the material, in particular of the portions with greater thickness following the drawing operation that are left in order to prevent undue deformation forces from being exerted and to not affect thicknesses.

In fact, and this will also apply to the components to be described later, the deformation operation on the tube length is mostly accomplished by merely bending the workpiece, with the use of relatively reduced forces, due to the small tube sections involved. These reduced forces mean a correspondingly reduced work of the presses employed. It is only by the end of the deformation operation (right side, FIG. 5) that a very short final stage occurs where the material is subjected to a squeezing operation which is, however, still performed with application of reduced forces (since there are left the nonuniformities that materialize the surface which the specific squeezing pressure is acting upon), and with very short strokes, thus again with reduced work.

FIG. 6 shows the operation for obtaining the component designated by reference numeral 16 in FIG. 1, the operation starting from previously drawn tube length 26 which is first widened into a socket-shape in an end region thereof, as shown at 46, then throughly flattened out, as in 48, in the end region, and finally machined to form the threads 50. If the portion 46 is bent inwardly, then the component 16 of FIG. 2 is obtained.

The operations for bringing the tube length 26 to the semifinished conditions of products 46 and 48 are illustrated in FIG. 7, where it is seen that the tube length 26 is initially flared out at its end, against a die 52, in order to form the semifinished product 46, which is then brought into contact with a plane die 54 to form the semifinished product 48. In this case, use is made of a plug 56 inside the tube length 26 and this latter is subjected to stress in an axial direction, with the material being allowed to have free expansion in at least one region of the die (in this example, in an outward direction).

In order that thicknesses should be maintained in the flanged portion of semifinished product 48, the die 54 has a recess 54' into which the outer edge of the socket-flared end of semifinished product 46 is inserted before closing the die. This flared portion will then be upset by the die 54 and formed by a squeezing operation so that the reduction in thickness thereof that occurred in the preceding step will now be compensated for, the thickness being brought back to the desired value.

A slight protrusion 48' (FIG. 6) will be left on the flanged edge, at the level of recess 54', and this may be helpful in ensuring improved sealing properties of the packing means.

The third component 18 shown in FIGS. 1 and 2 can be obtained, again by starting from the tube length 26, through a series of operations as diagrammatically shown in FIG. 8 in relation to the conical piece of FIG. 2, such operations comprising deformation steps to obtain the semifinished product 58, and machining steps to form the threads 60 and 62 and the lip 72, thereby obtaining the finished component 18 as viewed in FIG. 1 or in FIG. 2, wherein lip 72 is inclined.

Deformation is carried out as shown in FIG. 9, particularly in several steps and still by having the tube length 26 engaged on a plug 64. In the first step, introduction of an expander member 66 permits the diameter of tube length 26 to be slightly increased within the limits allowed by the material. Thereafter, the semifinished product 68 is subjected to axial deformation and it is pressed and shaped against the external die 70, having a cup-shaped flared configuration as shown in the middle portion of FIG. 9, and finally the bent over edge 72 (right side, FIG. 9) is formed thereon.

This operation is accomplished not only by maintaining the thicknesses of the material under control, in order to compensate for reduction in thickness due to increase in diameter by the compression-upsetting, until final deformations are obtained that are greater than these which would be allowed by the yield strength of the material, but also, and above all, by the use of a particular type of compression technique. According to the invention, in fact, in order that the semifinished product 68, which is subjected to compressive stress, may be so deformed as to cause it to fit the external die 70 exactly, the axially directed stress must be greater than the compressive yield point of the tube length section. More specifically, the axially directed stress must be greater than the critical point load of the individual fibers forming part of the free region of the tube length located in planes passing through the axis of the tube length and subjected to the mutual constraints which exist in the semifinished product 68. In this way, the freely deflectable region 1 of the tube length may be allowed to "bulge" outwardly. However, for the semifinished product to be able to exactly fit the external shape of the die 70, it is further necessary that deformation should take place in a centrally symetric manner and, therefore, by a lower load than the point lead of the freely deflectable region 1 of the tube length (considered as a whole), as well as respecting some given "frequency" relationships or, more precisely, "wave amplitude" relationships which are dependent on the thickness of the material and, for a slightest part, the diameter of the tube length forming the semifinished product. Since in these types of embodiments the involved thickness is defined, within rather narrow limits and substantially irrespectively of the diameter, as a function of the working process, it follows that also the original length of the portion 1 of the tube length 26, that is to be deformed in order to obtain the flared region of the semifinished product 58 (that is to say the length of the portion of tube 26 or 62 the diameter of which is changed in the die 70), will vary within very narrow limits and it has been experimentally found that, in order to obtain a type of semifinished product such as the semifinished product 58, such original length must have a value of about 35 mm±25% and, in any case, of less than 45 mm.

It has, in fact, been surprisingly ascertained that during operation outside of such limits it was not possible to obtain such a deformation of the tube length 26 as to permit the outer wall thereof to fit exactly the configuration of the die 70, with the thicknesses and all other necessary operative conditions being kept equal.

In any case, also in the deformation of FIG. 9, there is provided a possibility for the material to undergo free expansion, in order to carry out the deformation with low specific stresses, particularly in the inward direction, in the portion designated by 74.

In the case of male pieces, it is possible to execute a succession of operative steps starting from a tube length 76 (FIG. 10) not previously subjected to drawing, which is initially deformed by the aid of an internal plug 78 and against an external die 80 (FIG. 11) to form the polygonal region 82. Thereafter, the upper lip of the semifinished product 84 is bent over as indicated in the middle portion and on the right side of FIG. 11, substantially on the basis of what has been described in relation to FIGS. 6 and 7. Then, the cylindrical portion of the semifinished product 84 is machined to form threads 86.

Regarding other rules of conduct that may be observed in carrying out the operations described above, it is preferred that widia dies are used for the drawing operation, which dies should have very reduced tolerances, of the order of, for example, 0.01 mm, while deformation operations are conducted by making use of a lubricant which may advantageously comprise an antiscuffing mixture of oil and sulfur.

By using the above described process, pipe fitting components of the type set forth are obtainable in a advantageously inexpensive manner and are able to thoroughly comply with requirements of existing Standard Specifications. Such components are characterized, with respect to known types of pipe fittings, essentially in that they are made of steel, and in that they have, in any case, zero clearance angles. Among other features that differentiate the pipe fitting components obtained by the process of the invention from those of the prior art, are to be remembered the peculiar nonuniformities of their plane outside surfaces, which nonuniformities have been described above in relation only to the nut 14, but that also are to be found on all other described components.

Moreover, but as considered apart from the standardizations existing in the subject-matter, the process of the invention may produce fixed and loose, or releasable, pieces that are devoid of threads for connection to pipes. These pieces, which represent novel products, may be, with advantage and at low cost, fastened to a pipe by welding, this being now possible only by utilizing the steel connecting pieces according to the invention.

As already said, working operations on the concerned parts are mostly bending operations and, in more exacting cases, such as the nuts (FIGS. 4 and 5) and the idle or loose pieces (FIGS. 6,7,10 and 11), they consist of a partial squeezing operation only exerted upon the toric section of the striking face. With respect to conventional coining operations as conducted on similar pieces of the same material, there is obtained a favourable working section ratio in the range of 1/5-1/10.

By having recourse to a squeezing operation only for partially flattening-out the supporting surfaces, with working strokes in the range of 0.5-1.5 mm, the power expended in doing these operations is in a proportion of 1:25-1:50 as compared with conventional coining operations.

With respect to similar pieces obtained by pressworking of iron, presses with a power 1/5-1/10 times greater, and with speed five times higher, are utilized, as a result of which lower investment costs and increased productivity are achieved.

It should be apparent that many changes and variations in structural details may be made in carrying out the invention without departing from the spirit and scope of the invention as defined in the appended claims.

What we claim is:

1. A process for producing a pipe fitting component, said process comprising:

providing a cylindrical steel tube;

drawing said tube to form the exterior thereof to be of polygonal configuration and to form the thickness thereof to be substantially equal to the desired thickness of a component to be produced;

cutting the thus drawn tube to form a predetermined tube length;

positioning a plug within said tube length in contact with the inner surface thereof;

subjecting an end wall portion of said tube length to axial stress by means of a first die having a region for enabling free radial outward expansion of the material of said tube length, and thereby cold deforming radially outwardly and increasing the diameter of said end wall portion and decreasing the thickness thereof;

subjecting the thus increased diameter end wall portion to axial compression by means of a second die having a region for enabling free expansion of the material of said end wall portion, and thereby axially cold deforming and upsetting said material of said end wall portion to an extent to increase the thickness thereof to the original thickness of said tube length;

removing the thus deformed tube length from said second die and said plug; and machining at least one surface of said deformed tube length, thereby to result in a pipe fitting component.

2. A process as claimed in claim 1, wherein said step of increasing the diameter of said end wall portion is greater than the limit of the yield strength of said material.

3. A process as claimed in claim 1, wherein said second die includes a cup-shaped flared portion for shaping the exterior of said end wall portion, and wherein said axial stress is greater than the compressive yield point of said material.

4. A process as claimed in claim 3, wherein the freely deflectable portion of said end wall portion has an axial length, before deformation, of less than 45 mm.

5. A process as claimed in claim 4, wherein said axial length, before deformation, is approximately 35 mm±25%.

* * * * *